May 26, 1970     W. A. CROWLEY     3,513,934
AIR BEARING DEVICES Filed April 19, 1967     6 Sheets-Sheet 1

Fig. 1.

INVENTOR
WALTER A. CROWLEY
BY
Christensen, Sanborn & Matthews
ATTORNEY

May 26, 1970     W. A. CROWLEY     3,513,934
AIR BEARING DEVICES Filed April 19, 1967

INVENTOR
WALTER A. CROWLEY

ATTORNEY

May 26, 1970 W. A. CROWLEY 3,513,934
AIR BEARING DEVICES

Filed April 19, 1967 6 Sheets-Sheet 3

INVENTOR.
WALTER A. CROWLEY
BY
Christensen, Sanborn & Matthews
ATTORNEYS

May 26, 1970  W. A. CROWLEY  3,513,934
AIR BEARING DEVICES

Filed April 19, 1967  6 Sheets-Sheet 4

INVENTOR.
WALTER A. CROWLEY
BY
Christensen, Sanborn & Matthews
ATTORNEYS

INVENTOR
WALTER A. CROWLEY

ATTORNEYS

United States Patent Office 3,513,934
Patented May 26, 1970

3,513,934
AIR BEARING DEVICES
Walter A. Crowley, Mercer Island, Wash., assignor to The Boeing Company, Seattle, Wash., a corporation of Delaware
Filed Apr. 19, 1967, Ser. No. 631,974
Int. Cl. B60v 1/00, 1/16
U.S. Cl. 180—124                                        21 Claims

ABSTRACT OF THE DISCLOSURE

Stable supporting cushions of pressurized gas are maintained between opposing bodies through confinement by special valving diaphragms, each comprising a membrane of rounded (viz. circular, oval, etc.) planform configuration mounted on one of the bodies and having a gas discharge aperture therein with a free (i.e. unattached) edge or rim. Being free, the rim portion of the diaphragm is placed in elastic hoop tension by pressure of air acting behind the diaphragm bowing it with shallow convexity toward the opposing body. In this operating condition the aperture rim portion of the diaphragm extends generally parallel to the opposing body surface and moves flexibly toward and from such surface in sensitive response to changing differential pressure acting on the rim portion's opposite surfaces. This response action is regulatory in that the rim portion flexes toward the opposing body as the gap distance separating them increases locally, and away from the opposing body as such gap distance decreases. The diaphragm thereby controls the rate of loss of the pressurized gas through the air gap and regulates the pressure of gas comprising the cushion. By employing thin membranes of low specific density, the inherent regulating action of such valving diaphragms can be made very sensitive such that even abrupt changes of load magnitude or position, or the encountering of surface irregularities when moving across the opposing body do not disturb the stability of the air cushion support system. Further stabilization, particularly against flutter of the diaphragms, can be achieved by providing smaller by-pass apertures in the rim portions of their main apertures.

DESCRIPTION

This invention relates to gas cushion bearing devices and more particularly to new and improved valving diaphragms and apparatus incorporating the same for establishing and maintaining supporting films of pressurized air between opposing bodies. The invention is herein illustratively described by reference to the presently preferred embodiments thereof; however, it will be recognized that certain modifications and changes therein with respect to details may be made without departing from the essential features involved.

The long and intensive efforts of numerous individuals to devise gas cushion bearing systems have produced wide variety of designs and configurations. In the category of present interest such gas pressure bearings are intended to maintain a thin supporting cushion of pressurized gas by confinement between opposing bodies so as to hold them out of physical contact with each other while permitting relative motion between the bodies. More specifically, the present invention lies in that category of devices in which skirting or valving diaphragm means are utilized to confine supporting cushions of gas under pressure between opposing bodies except for such leakage as occurs through the air gap separating the skirting or diaphragm means on one of the bodies from the adjacent surface of the opposing body.

Usually the purpose of the cushions of air is to provide a frictionless bearing permitting relative motion between the bodies, examples being represented by load-bearing pallets movable on a factory floor or conveyor chute, vehicles traveling over the ground, machine component bearing applications, and others.

In this category of devices flexible valving diaphragms of one form or another have been employed heretofore in an attempt to overcome certain problems with rigid flange or flexible skirt enclosures. Usually, a plurality of these flexible valving diaphragms were arranged on the pallet or vehicle bottom so as to provide distributed areas or cushions of support. In fact, however, stability and efficiency have been lower than expected and less than required for widespread practical usage. It was found that even with the most flexible materials in the diaphragms, steady regulation of lift force was not realized and efficiency was low because of excessive air gap variations. In one instability mode, cyclic increase and decrease of pressure in the supporting gas cushions caused pistoning of one body relative to the other. Side to side rocking and flutter attended by noisy screeching of the diaphragm elements represented still other instability modes experienced with prior devices. Attempts to eliminate these effects included use of restraining lines, webs, or other elements connected to the skirts or diaphragm rims, and thickening or otherwise stiffening the diaphragm material. However, such arrangements were not satisfactory. The devices remained inefficient and unduly sensitive to changing load or surface conditions, with more frequent physical contacts with the ground than can usually be tolerated.

With these and other considerations in view, an important object of the present invention is to provide a more highly efficient and stable gas cushion bearing means. A specific object is to provide such means with inherent regulative capability to maintain a relatively constant and uniform distribution of gas pressure over the active area or areas of support between bodies and thereby avoid the tendency of former devices to flutter, rock, oscillate or piston unstably.

A related object is to devise such a gas cushion bearing means providing maximum load-supporting capability with minimum expenditure of power. Thus, for example, because the rate at which the gas escapes through the peripheral gap at the interface region between the bodies is minimized by the novel valving diaphragm means, the supply of air or other gas under pressure to the regions of confinement within the valving diaphragms may be derived from a motor-driven blower or pump of minimum size.

A related object of this invention is to devise such a gas cushion bearing means which will readily accommodate a wide range of loading and, in application employing a plurality of the novel valving diaphragms distributed over the interface region between the opposing bodies, will tolerate wide shifts in the effective load center without destabilizing the system.

Still another object is to achieve sensitive response in gas bearing valving diaphragm means enabling the same to accommodate quickly and slavishly to surface irregularities or roughness as well as changing loads being supported.

Still another object hereof is to develop an improved means for adapting the air cushion bearing concept effectively to serve in a wide variety of applications and permitting its embodiment in a wide variety of sizes, configurations, arrangements and materials in respect to the valving diaphragm elements so as to suit different operating and design conditions.

Another object hereof is to devise improved gas bearing valving diaphragm means relatively insensitive to the route or routes by which the pressurized gas is introduced to them. Thus the inflow of gas may occur partially or totally from locations within or behind the diaphragms, outside and across from the diaphragms or even from outlying regions requiring the inflow to be along the interface between bodies. This capability of the diaphragm elements to become and remain operative in any one or more of such modes expands the scope of design possibilities and the range of different applications available for air cushion bearing devices generally.

While the novel gas cushion bearing means of this invention are operable to minimize the occurrence of physical contact between bodies, nevertheless, in some situations, such as those involving extremely high relative speeds between bodies over rough surfaces complete avoidance of all physical contact is not likely. Even then, however, frictional drag and abrasive wear are minimized as a result of the thin and tough nature of the membrane materials used.

Low cost and simplicity of design and construction constitute other important objectives of the invention.

In achieving these and related objects the novel valving diaphragm action may be achieved with a nominally flat thin membrane of flexible synthetic plastic material having such a pattern of apertures and related lines of connection along which the membrane is joined to one of the bodies, that pressurized gas introduced behind the membrane will inflate portions of it convexly toward the opposing body and thus place the free edge or edges of the aperture rims in elastic hoop tension. In this operating condition the immediately surrounding rim portions of membrane material are disposed in close proximity to and in generally parallel relationship with the opposing body's surface so as to form therewith an annular gas escape gap around each such aperture. Under these conditions the hoop-tensioned aperture rim portions function as regulating valve diaphragms, flexing slavishly in sensitive response to changes in pressure difference acting at respectively opposite faces of the membrane. It is found that with the aperture edge terminating free, that is unfettered and unattached to the supporting body by lines, webs, membrane extensions or other material, except for the inherent support which it has through the surrounding body of the membrane in which the aperture itself is formed, extremely sensitive and rapid valving action is achieved in slavish response to differential pressure changes, such as those caused by surface roughness or irregularities, load changes, shifts in load distribution, gas supply pressure surges, etc., and that closely regulated gap distance is maintained so as to conserve the supply of pressurized gas and maintain a stable bearing cushion at all times. Moreover, as a further feature hereof, smaller holes formed in the membrane surrounding each main valving diaphragm aperture therein enhance the stability and further reduced any tendency for flutter or oscillations in the system. By employing valving diaphragms of different aperture size or different widths of their inflatively deflectable aperture rim portions, and arranging them alternately by a size a still greater order of stability is added to a gas bearing system of this invention.

The description which follows will illustrate by example these and other features, objects and advantages of the invention, by reference to the accompanying drawings.

Figure 1:
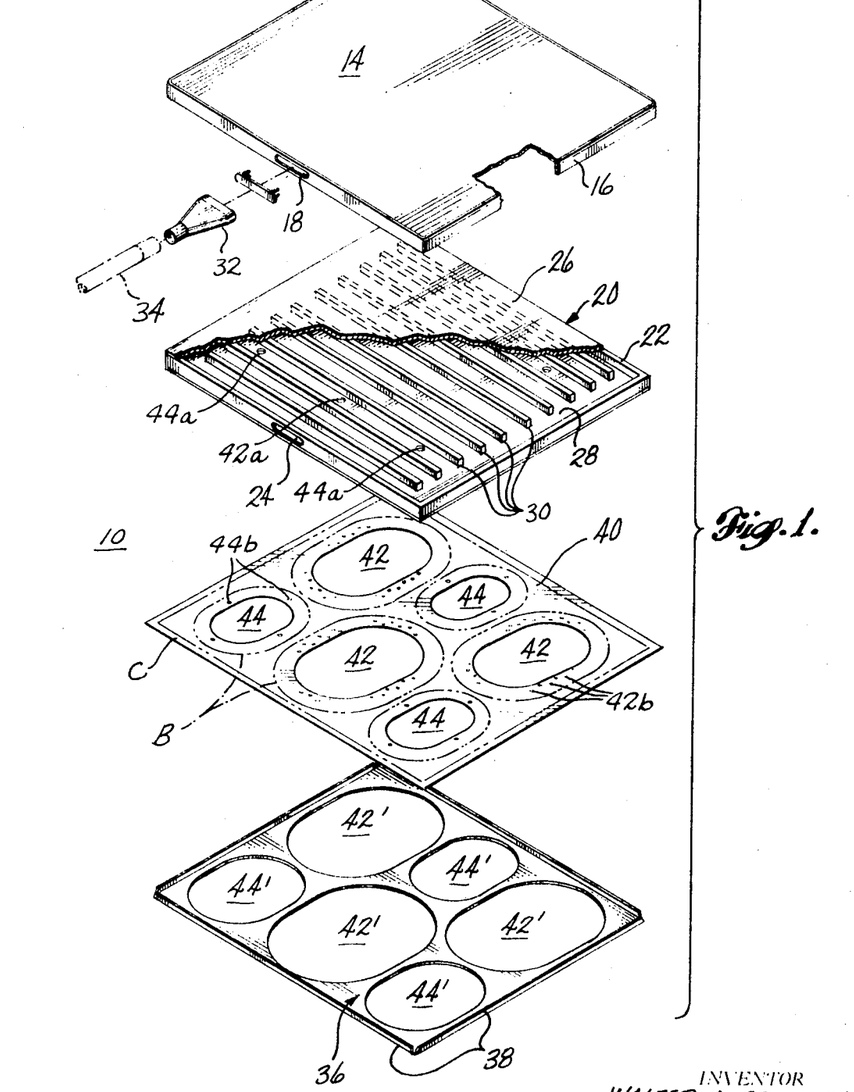
FIG. 1 is an exploded isometric view of a load-bearing pallet device incorporating the invention.
Figure 2:
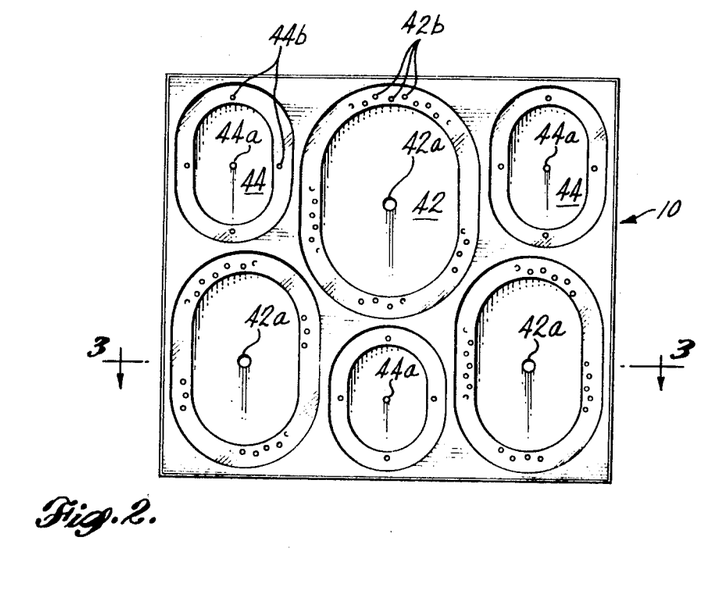
FIG. 2 is a bottom view of the pallet referred to in FIG. 1.
Figure 3:
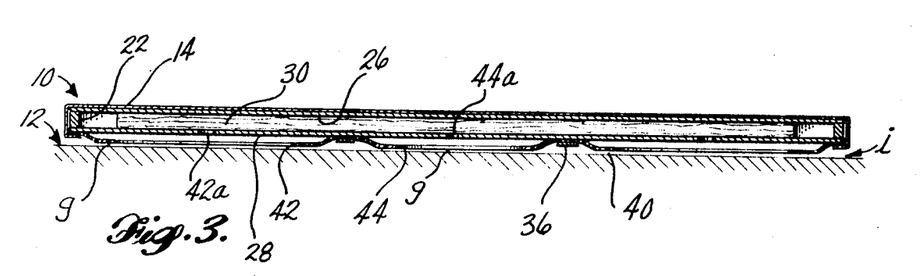
FIG. 3 is a sectional view taken on line 3—3 in FIG. 2.

Referring to FIGS. 1–3 inclusive, the illustrated load-bearing pallet 10 is of flat rectangular planform configuration designed to work on a flat ground surface 12. It comprises a generally rectangular top cover panel 14 having a depending peripherally extending flange 16 with an aperture 18 in one side thereof. This flanged cover fits over and conforms to the enclosed box 20 formed by a rigid rectangular frame 22 having an aperture 24 in registry with the flange aperture 18, and top and bottom plates 26 and 28 forming a plenum chamber. Spaced parallel divider ribs 30 bridging between the top and bottom plates 26 and 28 terminate short of the frame end members to form spaces which interconnect those formed by the divider ribs. Air under pressure is introduced into this plenum chamber through the registered openings 18 and 24, nozzle fitting 32 and air hose 34 leading to a source (not shown) of gas under pressure. A flat bottom cover panel 36 having upturned edge flanges 38 fits over the lower face of the box 20.

Between the bottom cover 36 and the bottom face of the box 20 is interposed a flexible membrane sheet 40 conforming substantially to the outline shape of the bottom of the box 20. In this example three large apertures 42 and three smaller apertures 44 staggered in alternating relation to the larger ones are formed in the flexible membrane 40. Similarly shaped but somewhat larger apertures designated 42′ and 44′, respectively, are formed in the bottom cover 36 at respective locations thereon registering with the respective apertures 42 and 44 in the membrane so that when the bottom cover is superimposed on the membrane, the rims or edges of the cover apertures will leave exposed substantially uniform marginal portions of flexible membrane material surrounding each of the membrane apertures. The broken lines B illustrate the approximate positions of the rims of apertures 42′ and 44′ in the assembled positions of the parts. Preferably the membrane 40 is secured as by stapling, adhesive bonding or otherwise, to the bottom panel of plenum chamber 20 along the lines B and also along the marginal periphery line C, although if the bottom cover panel 36 is sufficiently rigid or is itself otherwise suitably held against the membrane to clamp it firmly to the bottom face of the box so as to form a seal (minor leakage past the seal is unimportant) around each of the apertures 42 and 44, separate bonding of the membrane to the bottom panel 28 is not required.

Holes 42a are formed in the bottom panel 28 in registry with the large apertures 42 and holes 44a in registry with the small apertures 44, so as to conduct gas under pressure in the plenum chamber of the box 20 into the space between the bottom side of the pallet 10 and the underlying surface 12 on which it is to work, as shown in FIG. 3. Such gas flow causes inflation of the exposed aperture rim portions of the membrane (i.e. the membrane portions immediately surrounding the apertures) and causes them to bow convexly outwardly toward the surface 12 as depicted in FIG. 3. Such aperture rims are thus disposed in close proximity to the ground surface 12 in substantially parallel relationship therewith. Because these edges are thus disposed in elastic hoop tension by the gas pressure a self-regulating valving action is found to occur at each of the valving diaphragms thus formed by the aperture rims, which automatically varies the air gap g formed around each such aperture and thereby regulates the rate at which the pressurized gas escapes into the interfacial region i, thence to the atmosphere. The action is such that gas consumption is minimized and stable supporting cushions of gas are provided of maximum load capacity for the rate of power consumption by the gas pressure source.

In addition to the main apertures 42 and 44 in the membrane 40, smaller apertures 42b are formed in the membrane around the rims of the apertures 42 and smaller apertures 44b in the rim portions of the membrane surrounding the apertures 44. These small by-pass openings 42b and 44b are effective to resist any residual tendency for the stretched membrane material to flutter or oscillate as a result of pressure surges or compressive wave resonance effects in the system. Making the apertures 42 and 44 of oblong or elliptical form also helps prevent resonance effects. The use of alternately large and small apertures 42 and 44 at staggered locations is found to improve the stability of the platform to maintain stable support for loads which may vary or shift in location on the platform.

Figure 4:
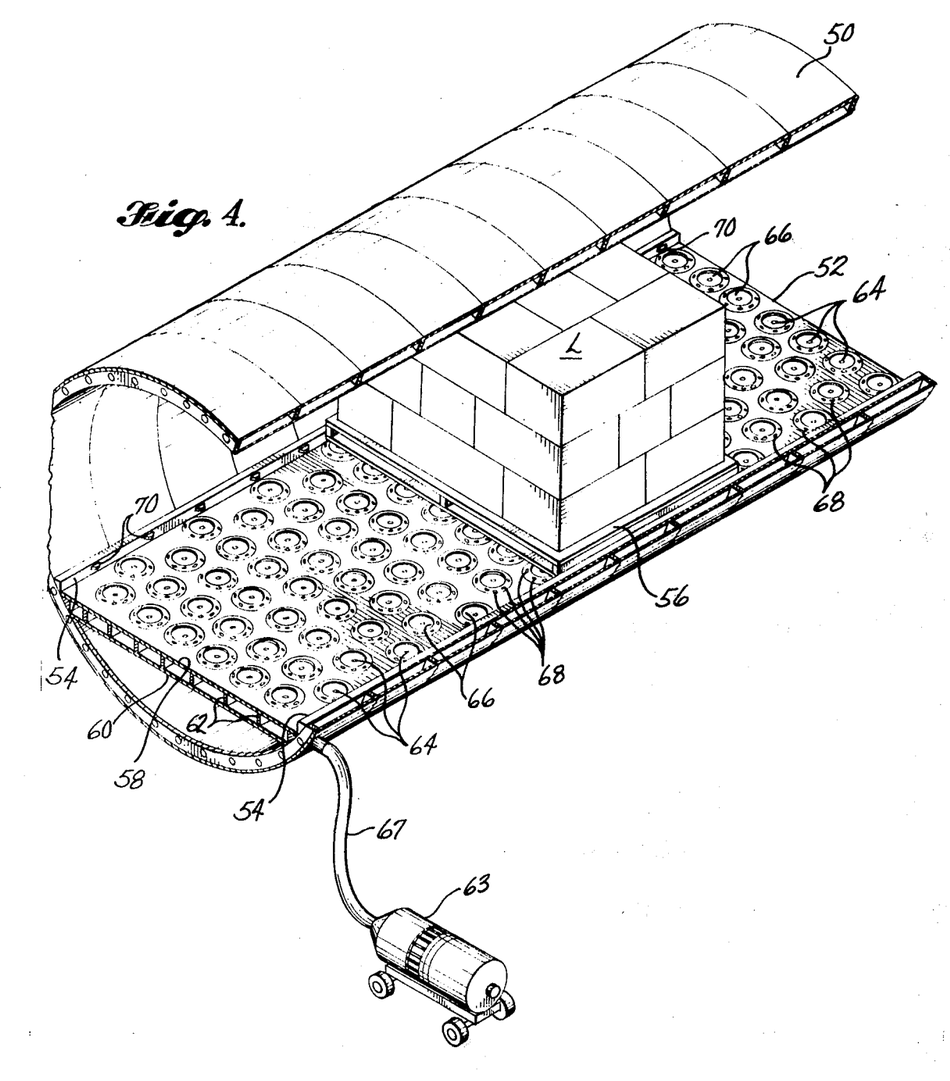
FIG. 4 is a fragmentary isometric view showing application of the invention to an airplane cargo hold floor.

In FIG. 4 a section of airplane fuselage 50 is depicted. Its flat deck or floor 52 has side rails 54 between which a pallet 56 bearing load L may be supported resting on floor 52. The floor structure comprises top and bottom panels 58 and 60 separated and interconnected structurally by ribs 62 to form a plenum chamber divided into flow channels having air escape openings 64 located at intervals over the length and width of the floor. Pressurized gas from blower 63 is delivered to this plenum system by way of hose 67. As in prior art devices these air escape openings are normally closed by check valves or the like (not shown) so that air under pressure introduced into the plenum chambers by the blower 63 through the connecting hose 67 does not leak out at locations where it will not be useful. These check valves may be actuated to the open position in any suitable manner such as by the physical presence of the load-supporting pallet 56 bearing down only, of course, on these valves lying directly beneath it. Overlying the floor is a membrane having apertures 66 therein registering with the floor openings 64. Surrounding each aperture 66 the membrane is joined to the floor panel 58 so as to form a rim portion of membrane material which is free to be inflated upwardly. Preferably smaller holes 68 are formed in these flexible rim portions of membrane material as in the prior example and serve as by-pass elements which stabilize the valving diaphragms against flutter.

With the load bearing pallet 56 bearing downwardly against the valve elements in the floor openings 64, gas under pressure is introduced into the interfacial region between the floor 52 and the bottom surface of the pallet and is partially trapped by the inflated rim portions of the membrane surrounding apertures 66 so as to produce pressure-regulated gas cushions over each such aperture 66. The combined load-bearing capability of these gas cushions distributed over the bottom surface of the pallet 56 raises the pallet from the floor and supports it for substantially frictionless motion over the floor. If desired similar air cushion bearing units may be provided in side walls or rails 54, but in the example round anti-friction rollers 70 are used instead. On such a support the pallet may be moved lengthwise of the floor to any desired location in the airplane hold with a minimum of effort and may be followed by other pallets as desired.

Figure 5:
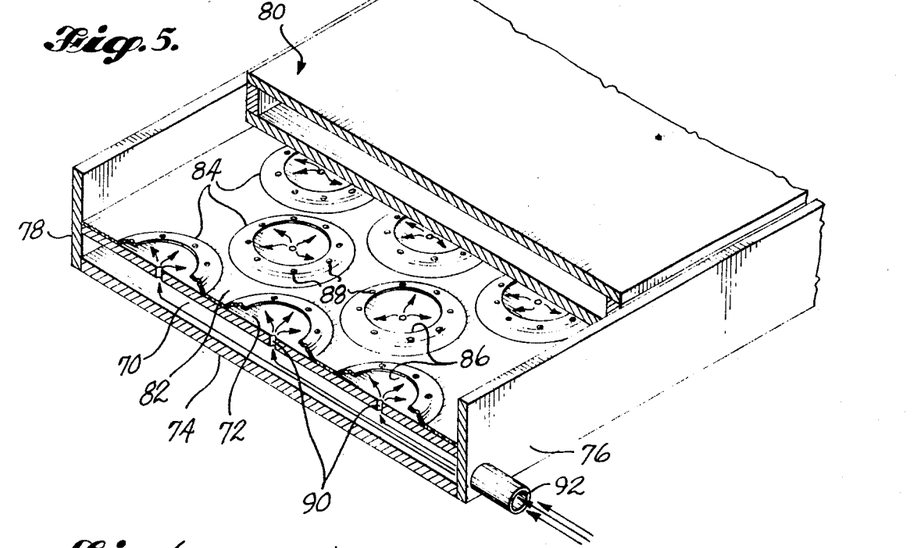
FIG. 5 is an enlarged isometric view of a pallet-supporting floor or guide-away such as that used in FIG. 4, to illustrate the air cushion valving diaphragms incorporated therein.

In the scaled-up illustration of a pallet conveyor shown in FIG. 5 a plenum chamber 70 is formed between the parallel top and bottom panels 72 and 74 and the side panels 76 and 78 of an elongated chute or trough in which the side panels project upwardly to form guides for the pallet structure 80 resting over the top panel 72. The arrangement is similar in principle to that of FIG. 4. Such a structure when provided with air bearing means at the interface between the pallet 80 and the top panel 72 may be used as a conveyor or the like for relatively friction-free conveyance of loads on pallets along a defined path. A sheet of flexible plastic or similar material 82 overlying the top panel 72 is bonded or otherwise joined to such panel along circular lines 84 with the membrane material having central apertures 86 within such boundary circles so as to form the inflatable valving diaphragms. Smaller apertures 88 distributed around each main aperture 86 serve a flutter suppression function as in the preceding embodiments. Air inlet holes 90 are formed in top panel 72 within each of the valving diaphragm spaces so as to conduct air from the plenum chamber into the enclosure of each diaphragm. Plenum chamber 70 receives pressurized air or other gas through the supply conduit 92.

Figure 6:
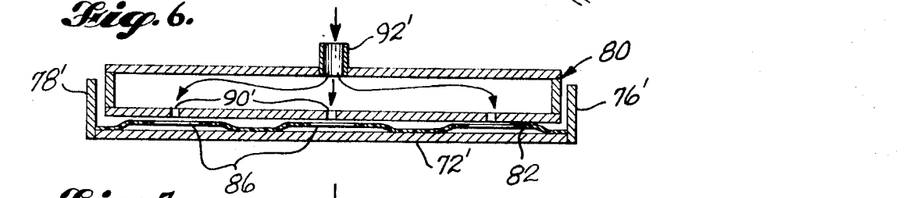
FIG. 6 is a transverse sectional view of a modified form of the device shown in FIG. 5.
Figure 7:
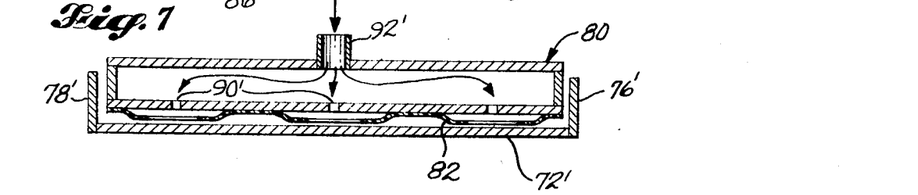
FIG. 7 is a transverse sectional view of a second modified form of the device shown in FIG. 5.
Figure 8:
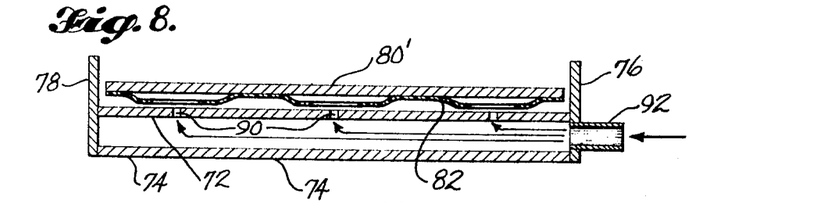
FIG. 8 is a transverse sectional view of still another modified form of the same device.

In the embodiment shown in FIG. 6 pressurized gas is delivered through conduit 92′ into the interior of the pallet 80 as a plenum chamber. From there it is discharged into the interface region between the lower face of the pallet and the stationary panel 72′. Panel 72′ forms the bottom of a conveyor trough having upright sides 76′ and 78′. In this case the valving diaphragm membrane sheet 82 is bonded directly to the panel 72′ and the valving diaphragms 86 therein receive air through the openings 90′ by direct flow across the thickness of the interface region between the bodies. In the inverted variation shown in FIG. 7 the valving diaphragm membrane 82 is bonded to the bottom panel of the plenum-forming pallet 80, which is provided with air discharge opening 90′ as in the form of FIG. 6. Here the conveyor chute bottom panel 72′ comprises a flat ground surface. In FIG. 8 the pallet is represented by the flat panel 80′, to which the diaphragm-forming membrane sheet 82 is bonded in the manner previously described whereas the hollow-bottom conveyor chute is formed as a plenum chamber as in the case of FIG. 5, with air discharge openings 90 feeding directly up into the interface region between the bodies. In a sense, therefore, this configuration is the inversion of that in FIG. 6. In FIGS. 6, 7 and 8 the membrane configuration is assumed similar to that in FIG. 5.

Figure 9:
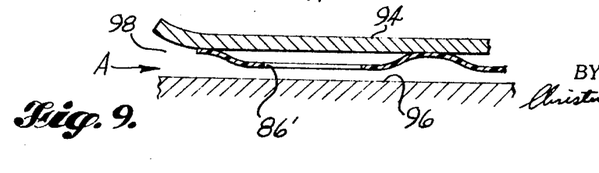
FIG. 9 is a transverse sectional view illustrating an alternative method of introducing pressurized gas into the enclosure spaced formed by the valving diaphragm.

FIG. 9 illustrates still another variation in the manner of locating the valving diaphragm elements of the air bearing system and of supplying the interface region with pressurized gas in order to inflate and sustain the valving diaphragms to produce air pressure cushions between the bodies. In this instance the opposing bodies are designated 94 and 96 and neither is required to serve as a plenum chamber nor as a means to conduct air directly through its interface surface to the interface region. Instead, such air is moved into the interface region edgewise as shown by the arrow A (i.e. along the direction of extent of the interface region) either by blowing it in forcibly from an external source, or by the simple act of producing relative parallel motion between the bodies 94 and 96 so as to move dynamic film of pressurized air into and through such region, and in the process of such motion permit the valving diaphragms to collect some of the air under elevated pressure in the cavity spaces formed within such valving diaphragms. In order to enhance this effect, if desired, the leading edge of one body may be flared away from the other body so as to form an outwardly divergent throat or scoop at 98 which will increase the collected volume of air thus entrained between the bodies accompanying such motion and thereby the amount of air cushion pressure developed to sustain bearing loads between them.

Figure 10:
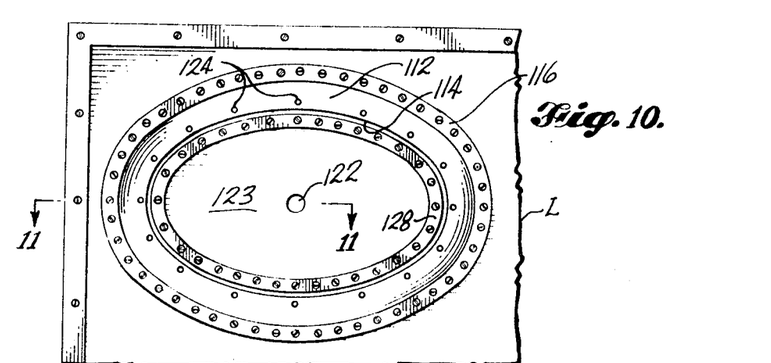
FIG. 10 is a face view of a corner portion of a pallet or other vehicle body incorporating still another embodiment of the invention.
Figure 11:
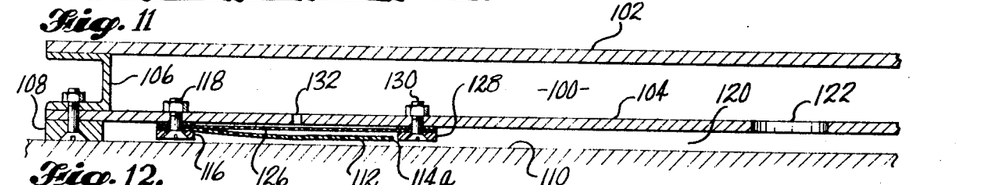
FIG. 11 is a sectional view at an enlarged scale taken on line 11—11 in FIG. 10 with the valving diaphragm element related and the pallet resting physically on the ground surface.
Figure 12:
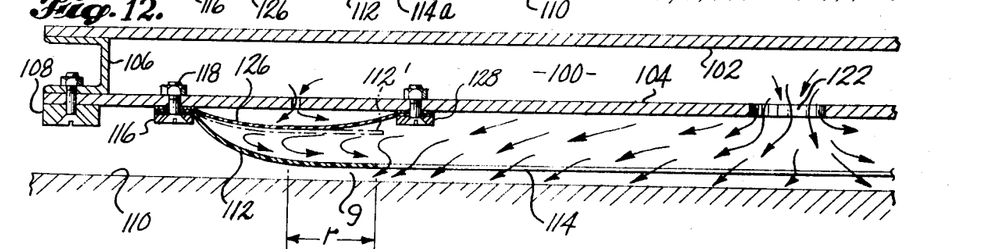
FIG. 12 is a view similar to FIG. 11 with the valving diaphragm element assuming operating configuration.

In FIGS. 10 through 12 a plenum chamber 100 is formed between parallel top and bottom plates 102 and 104 and channel section frame members 106. A footing bar 108 is joined peripherally to the bottom face of the panel 104 along the edge thereof as a physical support for the device on a ground surface 110 when the device is not being carried by the air pressure film. One or more valving diaphragm type air bearing devices 123 are mounted on the bottom panel 104, the example of FIG. 10 showing a single such unit, but the fragmentation line L indicates that only one corner section of the panel is being illustrated so that with the full panel there may be room for other such units. The unit shown comprises an elliptically formed membrane 112 having a generally central elliptical aperture 114 having a free edge or rim at 114a. The outer edge of this diaphragm is peripherally secured and sealed to the bottom surface of the panel 104 by a rigid clamp ring 116 held in place by mounting bolts 118. Air under pressure from the plenum space 100 is delivered to the interface region 120 between the body 102–104 and the body 110 through the opening 122. Anti-flutter holes 124 distributed around the rim of diaphragm 112 serve the same function as in the preceding embodiments. As a further feature in the present embodiment, there is a second elliptical diaphragm 126 mounted by both its inner and outer peripheral edges against the bottom face of panel 104. Its outer periphery is held by the clamping ring 116 whereas its inner peripheral edge is held by a similar clamping ring 128 and mounting bolts 130. One or more small bleeder holes 132 formed in panel 104 behind the diaphragm 126 permit pressurized air to enter the region behind the diaphragm and thus inflate the diaphragm 126 downwardly as depicted in FIG. 12. The function of initial downward inflation and convex bowing of the secondary diaphragm 126 is to initiate downward deflection of the rim portion of the air bearing diaphragm 112 so that it will immediately catch air flowing radially outward from the central region within the diaphragm 112 and thus initiate establishment of the operating condition of diaphragm 112 as shown in the latter figure. The initial positioning of diaphragm 112 produced by the diaphragm 126 is shown by the dotted line 112'. Thus starter diaphragm 126 represents a positive means of insuring reliable immediate inflation and operative positioning of the air bearing diaphragm 112 and avoids any possibility that outflow of air may fail to catch the latter's rim and deflect it outward.

In the enlarged view of the air-gap regulating diaphragm 112 shown in FIG. 12, the inflated shape of the flexible membrane material comprising the valving diaphragm is depicted in approximately accurate configuration along one edge portion. From this showing it will be seen that the diaphragm rim portion lies in approximately parallel relationship to the underlying ground surface 110 over a substantial radial extent $r$ and that in this region, and particularly at the rim of the aperture 14, the material is in elastic hoop tension. Moreover, in this condition the relatively thin and flexible diaphragm material is capable of undulating or deflecting with great ease in directions (transverse to itself) toward and from the surface 110, so as to vary the thickness of gap $g$ sensitively in response to changes of differential pressure acting against the respectively opposite (upper and lower faces) of the diaphragm rim portion. Such changes of pressure may be caused by any of different conditions, such as fluctuations in local pressure due to total system pressure fluctuations, changes in loading or shifts in load distribution, unevenness in the surface of the ground 110 during relative motion between the bodies parallel to the interface therebetween, and others. In any event, since the low-mass diaphragm rim edge is free to flex up and down unopposed by the dampening effect of trapped gas as in fully or partially enclosed type valving diaphragms, and untrammeled by any restraining elements such as lines, webs or other restraints imposed thereon, it will flex sensitively to changing pressure differentials. Moreover, in so doing it will regulatively vary the air gap $g$, in the necessary sense to oppose the transient condition which disturbed the pressure balance, thereby to maintain an efficient stable air cushion as desired.

As previously mentioned added stability against oscillation and flutter is achieved by the provision of smaller bypass openings 124 distributed around the rim of the diaphragm. It is thought that they perform this service possibly by acting as smaller valving diaphragms adding their effect to that of the main aperture rim diaphragm effect, and, being smaller, acting quickly enough to suppress the higher-frequency transient effects representing a flutter condition.

Figure 13:
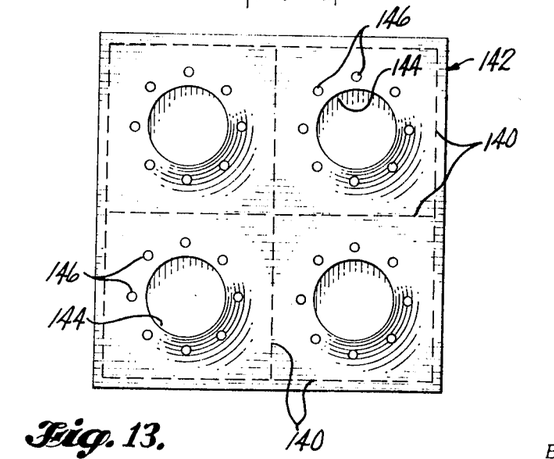
FIG. 13 is a face view of an air cushion bearing device incorporating four valving diaphragms with round apertures but with square membrane peripheral planform configurations.

In the variation shown in FIG. 13 the pressurized gas cavity which is formed by and behind each valving diaphragm is not round or rounded in outer planform but is square or rectangular. This is depicted by the intersecting four straight marginal lines and the two crossed lines 140 forming four squares superimposed on the bearing surface of the body 142. A valving diaphragm aperture 144 is formed generally in the center of each of the squares. Flutter suppression apertures 146 formed around the rim of each of the central apertures complete the diaphragm cluster.

Figures 14, 15, 16, 18, 19:
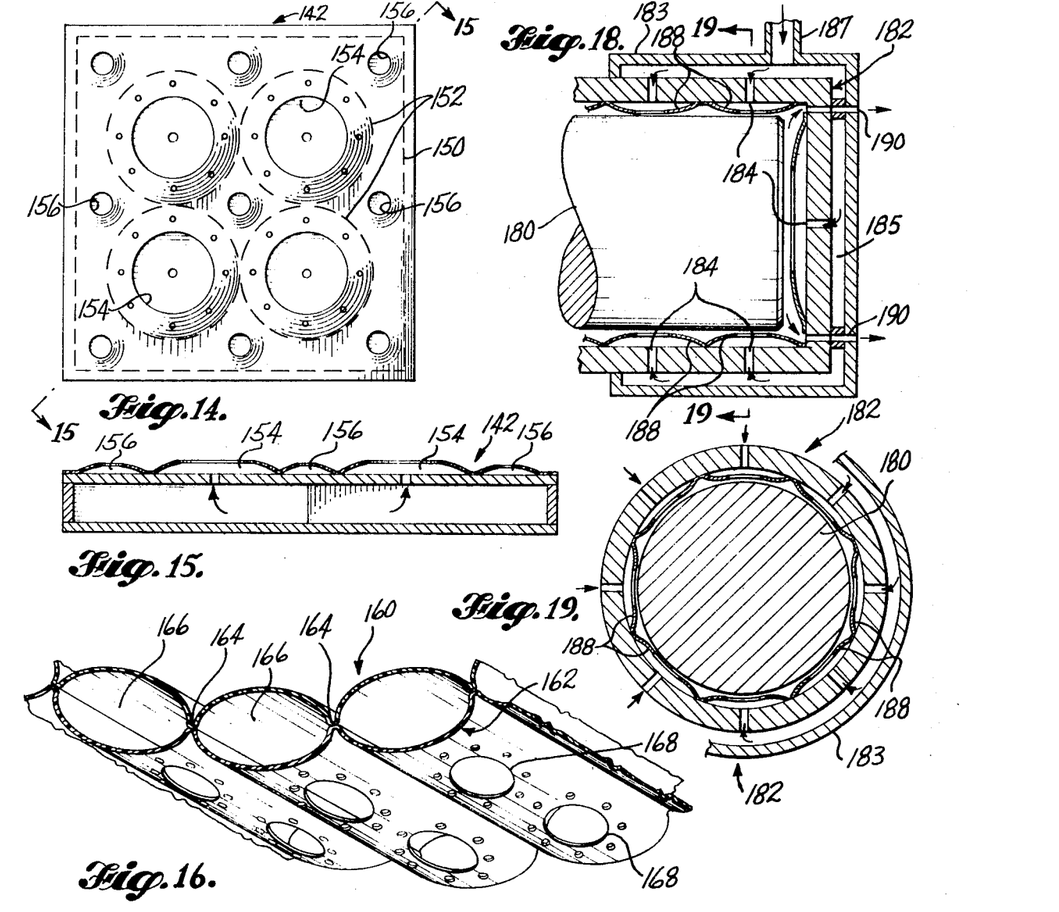
FIG. 14 is a face view of an air cushion bearing device with four circular main valving diaphragm apertures and a number of smaller apertures formed in outlying and intermediate regions of the same membrane sheet, whereby pressurized gas permitted to flow behind the diaphragm membrane and thus inflate the same in such regions is harnessed through the valving diaphragm effect achieved by the smaller apertures as well as the larger ones.
FIG. 15 is a transverse sectional view taken on line 15—15 in FIG. 14.
FIG. 16 is a fragmentary isometric view illustrating still another application of the invention, in this case to a flexible, inflatable body having tubular plenum spaces with a series of valving diaphragm apertures formed along the working surface of each plenum chamber.
FIG. 18 is a longitudinal sectional view showing use of the invention to provide a combined thrust and rotation bearing support for the end of a shaft.
FIG. 19 is a transverse sectional view taken on line 19—19 in FIG. 18.

In the embodiments of FIGS. 14 and 15 an additional variation appears in which the body 142 carries a sheet of flexible membrane material marginally bonded to body 142 along the dotted peripheral line 150 and also at intermediate locations along four circular lines 152, with valve diaphragm apertures 154 formed generally centrally within the bond line circles 152. In this case, however, the regions lying between the bond circles 152 and the marginal attachment lines 150 are assumed to be sufficiently wide that should pressurized gas leak through the bond lines defined by circles 152 in the space between the diaphragm and the opposing face of the body 142 the membrane material would bow away from the body in these outlying regions. Such outword bowing of material could produce physical contact and drag between the membrane sheet and an opposing ground surface against which the device functions. In order to prevent this from happening, it is possible to form secondary valving diaphragm apertures 156 in these outlying regions so as to form additional lift cushions and thereby obtain increased total lift for the air breathing system while avoiding contact with the ground surface.

Figure 17:
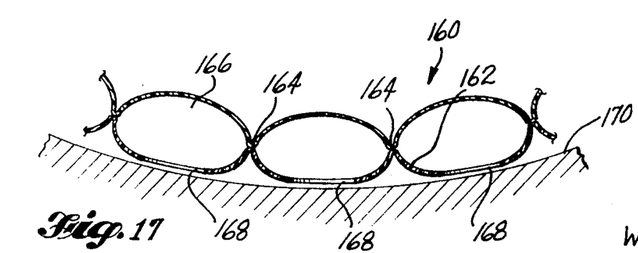
FIG. 17 is a transverse sectional view of the device shown in FIG. 16 functioning on a curved ground surface.

In FIGS. 16 and 17 certain principles of the invention are incorporated in a flexible body which, for purposes of pictorial analogy resembles a conventional air mattress used for sleeping, comprising flexible top and bottom panels 160 and 162 joined along parallel lines 164 extending longitudinally of the device to form elongated plenum chambers 166 which assume cross-sectionally convex-convex form when these chambers are filled with pressurized gas. With series of valving diaphragm apertures 168 formed in one panel (162) at interval locations along the length of each of the plenum chambers 166, the body may be supported on air cushions over a ground surface 170. The action is depicted in FIG. 17. The described gap-regulating diaphragm action is experienced in such a device with the membrane convexly curved in only one plane, although the action is not as efficient or effective as in the use of valving diaphragms curved outward in mutually orthogonal planes. Flexibility of the body 160, 162 to bend, particularly in planes transverse to its panel joint lines 164 enables the device to accommodate itself to any of different contours of a ground surface 170, such as that of concave form shown in FIG. 17. Such a device is capable of bending variably so as to accommodate changing surface contours if encountered during motion over a ground surface.

In the embodiment shown in FIGS. 18 and 19 a shaft 180 is socketed in a bearing retainer 182 of cylindrical cup-shaped configuration surrounded by a jacketing enclosure wall 183. The latter forms a plenum chamber 185 in which gas under pressure may be introduced by way of conduit 187. Ports 184 at distributed locations in the peripheral wall and in the end wall of retainer 182 let the pressurized gas into the surface region between shaft 180 and retainer 182. Diaphragms 188 mounted inside the retainer 182 at locations in registry with the respective ports 184 respond to the inflow and pressure of this gas so as to form gas bearing cushions of the described type supporting the shaft out of physical contact with the retainer 182. Escape of this gas from the system occurs through ports 190. For high-temperature applications these diaphragm elements in this instance may be formed of thin metal sheet material, which is sufficiently thin and flexible, will perform adequately as valving diaphragms in the manner described. Thus the pressurized gas used in their operation in one application may comprise the very hot exhaust gases from a gas turbine engine directed by suitable means (not shown) to the interior spaces behind such diaphragm functioning as low-friction high-temperature bearing supports for the shaft.

In most applications, however, thin plastic sheet material such as polyvinylchloride or equivalent is preferred for the membrane. Materials such as natural rubber and most synthetic rubbers are too elastically stretchable, however, when made thin, to perform well in the role.

These and other aspects of the invention will be evident to those skilled in the art based on an understanding of the foregoing disclosure thereof.

What is claimed is:

1. Gas cushion bearing means for separating two bodies in proximate relationship by a cushion of gas, comprising at least one flexible membrane interposed between the bodies and extending normally parallel to and along their interface, said membrane having an aperture therein and being joined to one body to define a peripheral joint which encompasses an area greater than the area of said aperture, said membrane curving from the points of attachment on the one body toward the other body and toward said aperture, so as to form an inflatable diaphragm which bows convexly toward the opposing body by introduction of pressurized gas behind the membrane, the aperture being of rounded form and the rim of said aperture comprising a free edge, said membrane being thereby so constituted that such inflation thereof places said rim in hoop tension while disposing the immediately surrounding portion of the membrane generally in a plane substantially parallel to the interface, thereby to form conjunctively with the opposing body a regulatory gas escape gap leading radially outward in different directions from said aperture, which gap is increased and decreased locally by flexure of the rim defining said aperture transversely of the interface responsively to changes in the differences of gas pressures acting locally against opposite faces of said membrane portion.

2. The bearing means defined in claim 1, wherein the aperture and membrane configuration are both substantially circular and substantially concentrically related.

3. The bearing means defined in claim 1, wherein the aperture and membrane configuration are both generally elliptical and substantially concentrically related.

4. The bearing means defined in claim 1, wherein adjacent to the aperture the membrane has at least one smaller opening through which such gas may also escape, by-passing the larger aperture.

5. The bearing means defined in claim 1, and means to introduced pressurized gas behind the membrane comprising at least one port in said one body.

6. The bearing means defined in claim 1, and means to introduced pressurized gas behind the membrane comprising at least one port in said other body directing its discharge into the interfacial region between the bodies.

7. The bearing means defined in claim 1, wherein the membrane comprises a plastic sheet which is substantially flat prior to the application of pressurized gas thereto.

8. The bearing means defined in claim 7, wherein the one body to which the membrane is joined comprises a generally flat surface facing the opposing body, with the membrane being joined substantially directly to that surface, whereby membrane inflation is initiated by entry of gas into the interface between itself and said surface with said inflation causing the membrane to curve away from the body to which it is attached and toward said aperture.

9. The bearing means defined in claim 8, further comprising extensible means mounted on said one body and adapted to be extended toward the opposing body to initiate separation of the membrane from the one body preliminary to inflation of said membrane.

10. The bearing means defined in claim 9, wherein the extensible means comprises an inflatable member mounted on the aforesaid surface underlying the membrane, and means associated with the one body to conduct gas under pressure behind said inflatable member so as to bulge the same toward the opposing body.

11. The bearing means defined in claim 10, wherein the inflatable member comprises a flexible strip of generally annular form surrounding the membrane aperture, and means forming pressurizable joint connections along the inner and outer peripheral edge of the strip to the one body.

12. The bearing means defined in claim 11, wherein the means to conduct gas comprises a chamber formed in association with the one body and communicating for gas flow with the space behind said membrane.

13. A vehicle system incorporating the bearing means defined in claim 1, wherein one of the bodies comprises a vehicle and the other body presents a ground surface over which the vehicle moves supported on said bearing means, said bearing means comprising a plurality of such apertured membranes successively distributed across the interfacial region between the bodies with the center of gravity of the vehicle overlying a location between apertures.

14. The vehicle system defined in claim 13, wherein the membranes have apertures of respectively different sizes arranged in a pattern with larger apertures separated by smaller ones.

15. The vehicle system defined in claim 13, wherein adjacent to the rim of each aperture at least certain of the membranes have a plurality of smaller openings through which such gas may also escape, by-passing the larger aperture.

16. In a gas bearing device, a backing medium, a normally substantially flat flexible diaphragm strip joined along at least a portion of its periphery to the backing medium so as to form therewith a cavity behind said diaphragm, the diaphragm being formed to inflate with shallow convexity from its peripheral joint inwardly thereof by gas pressure in the cavity and having a generally round central opening of an area less than the area encompassed by the peripheral joint with its rim portion comprising a free edge substantially unattached otherwise to the backing medium, said free edge being placed in hoop tension by such inflation with the area of said membrane immediately adjacent said opening being substantially flat and parallel to the plane of said rim portion before and after inflation whereby the rim portion is free to move up and down.

17. The device defined in claim 16, wherein the diaphragm at locations distributed around the rim portion thereof has a plurality of smaller openings for the escape of such gas, by-passing the first-mentioned opening.

18. The device defined in claim 16, wherein the diaphragm at locations distributed around the rim portion thereof has a plurality of smaller openings for the escape of such gas, by-passing the first-mentioned opening, and the diaphragm and first-mentioned opening are oblong.

19. In a gas bearing system, means to maintain a pressurized film of gas at an interfacial region between two relatively movable bodies, comprising a normally substantially flat flexible membrane mounted substantially flatwise by its outer periphery on one body and having a rounded free-rimmed aperture therein, said membrane curving from its said outer periphery toward the aperture to define a substantially flat area around said aperture with the area of the aperture being substantially less than the area encompassed by the outer periphery attached to the said one body, and means introducing pressurized gas into said region through said aperture from one side of said membrane so as to bulge the membrane outwardly in the direction of gas flow and thereby place its aperture rim in hoop tension in proximate relationship with the other body.

20. A self-regulating valve device for controlling flow of gas under pressure through an interfacial region between two bodies in maintaining a supporting gas film between said bodies, said device comprising a membrane joined peripherally in generally flatwise condition on one body of the side thereof facing the other body and forming with said body a pressurizable gas cavity behind the membrane, said membrane having a gas escape opening therein of an area substantially less than the area encompassed by the periphery joined to the body with the membrane curving inwardly from said periphery to the said opening to define a section immediately adjacent said opening which is substantially flat and being adapted to bow outwardly in tension toward said other body with said section remaining substantially flat so as to establish hoop tension in the aperture rim in response to pressure of gas introduced in said cavity.

21. The combination defined in claim 20, wherein the rim portion has a plurality of smaller air escape openings therein adjacent the rim's edge.

References Cited

UNITED STATES PATENTS

| | | | |
|---|---|---|---|
| 3,134,452 | 5/1964 | Latimer-Needham | 180—128 |
| 3,182,740 | 5/1965 | Cockerell | 180—128 |
| 3,243,004 | 3/1966 | Mackie | 180—124 |
| 3,247,921 | 4/1966 | Latimer-Needham et al. | 180—124 |
| 3,260,322 | 7/1966 | Mackie | 180—124 |
| 3,268,022 | 8/1966 | Gustafson | 180—116 |
| 3,282,360 | 11/1966 | Amann et al. | 180—116 |
| 3,375,893 | 4/1968 | Mackie | 180—124 |

A. HARRY LEVY, Primary Examiner

U.S. Cl. X.R.

180—125, 127; 214—1; 308—9, 122